(12) United States Patent
Ebster

(10) Patent No.: US 6,453,938 B1
(45) Date of Patent: Sep. 24, 2002

(54) WARM DRINKING WATER CONDUIT SYSTEM

(75) Inventor: Wilfried Ebster, Taufkirchen (DE)

(73) Assignee: Gewofag Gemeinnützige Wohnungsfürsorge AG, München (DE)

( * ) Notice: Subject to any disclaimer, the term of this patent is extended or adjusted under 35 U.S.C. 154(b) by 0 days.

(21) Appl. No.: 09/823,981

(22) Filed: Apr. 3, 2001

(51) Int. Cl.⁷ ............................. F24H 9/12; F16K 49/00
(52) U.S. Cl. .................. 137/337; 137/563; 137/565.29; 137/624.12; 126/362
(58) Field of Search ................................. 137/340, 337, 137/565.29, 563, 624.12; 126/362; 236/12.12

(56) References Cited

U.S. PATENT DOCUMENTS

| | | | |
|---|---|---|---|
| 3,776,261 A | * 12/1973 | Houghton | 137/337 |
| 5,050,640 A | * 9/1991 | Cowley | 137/606 |
| 5,983,922 A | * 11/1999 | Laing et al. | 137/338 |
| 6,026,844 A | * 2/2000 | Laing et al. | 137/337 |

* cited by examiner

Primary Examiner—A. Michael Chambers
(74) Attorney, Agent, or Firm—Kanesaka & Takeuchi

(57) ABSTRACT

The invention relates to a warm drinking water conduit system, with at least one drinking water heater/storage tank for warm drinking water, with a fresh water supply conduit for supplying cold drinking water into the tank and with a heat exchanger connected to a heating circuit and intended for heating the supplied cold drinking water in the tank to a predetermined temperature and for maintaining the warm drinking water temperature in a conduit system connected to the tank and having tapping points for the extraction of warm drinking water, the warm drinking water circulating in the conduit system by means of a pumping device, wherein the drinking water heater/storage tank is tied into the warm drinking water circulation circuit, the circulation temperature in the entire conduit system being maintained at a level such that the warm drinking water is largely free of microorganisms, in particular legionellae, and that the tank is thermally disinfected of microorganisms in rota in a largely reduced conduit branch during a relatively short time span by means of an increased circulation temperature.

8 Claims, 1 Drawing Sheet

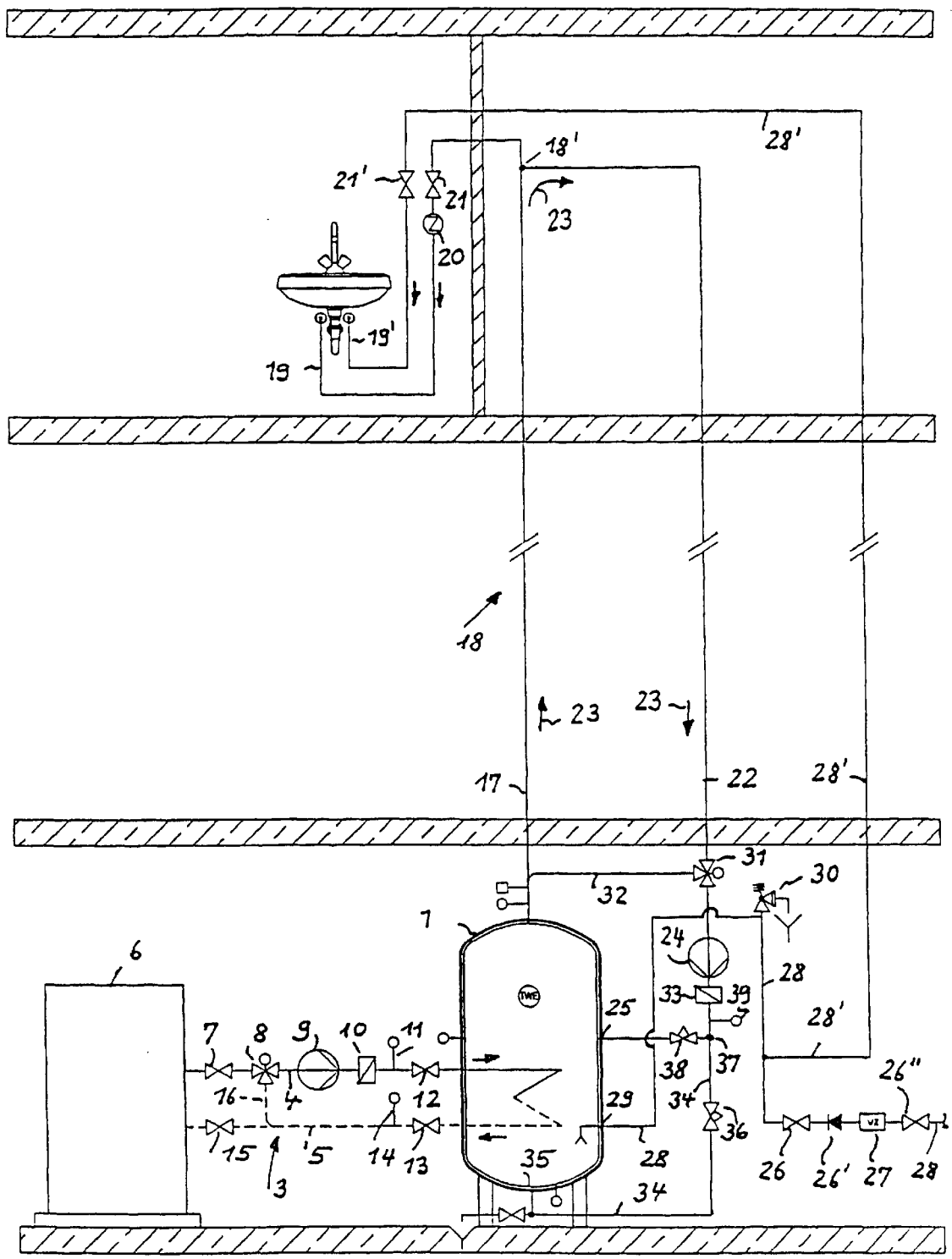

WARM DRINKING WATER CONDUIT SYSTEM

The invention relates to a warm drinking water conduit system according to the preamble of claim 1.

There are known drinking water conduit systems which have hitherto not sufficiently ensured that, above all, microorganisms harmful to health, in particular legionellae, do not multiply in warm drinking water. This applies mainly to relatively large conduit systems with central drinking water heater/store, where there may be stagnant water with temperatures of between 30° C. and 45° C.

When water contaminated in this way with legionellae is extracted from the conduit system, for example, by showers, whirlpools or air-conditioning systems in which breathable aerosols are formed, there is known to be a considerable risk of influenza-like illnesses and pneumonia.

It is known that legionellae are killed above 50° C. and that the killing time decreases with an increase in temperature.

The object of the invention, therefore, is to design a warm drinking water system of the above type, in such a way that, when warm drinking water is extracted, the risk of illness caused by microorganisms, in particular legionellae, can be largely ruled out. At the same time, thermal disinfection is to be capable of being implemented by means which are simple in terms of hydraulics and regulation and are easy to operate, while the investment costs can be kept comparatively low under energy-optimized conditions. In this context, the idea on which the invention is based is to keep the drinking water heater/storage tank constantly tied into the warm water circulation circuit, the circulation temperature being maintained at a level such that the warm drinking water in the warm water conduit system can be kept largely free of microbacteria, in particular legionellae, and such that the tank can be thermally disinfected by rota, during a relatively short time span, in a substantially reduced conduit branch by means of an increased circulation temperature.

The object is achieved, according to the invention, by means of the defining features of claim 1. Advantageous embodiments may be gathered from the features of the subclaims and from the following description.

The invention is described below, merely for one exemplary embodiment, by means of a diagrammatic drawing. The drawing contains only those parts which are necessary for understanding the invention.

The exemplary embodiment according to the invention shows a central drinking water heater/storage tank 1 with a known inner heat exchanger 2 which is connected to any desired heating source 6 via a heating circuit 3 with a heating forward flow 4 and with a heating return flow 5. The tank 1, for example having a capacity of >400 liters, may be installed, together with the heating source 6, in a basement or in another suitable place of installation. In the forward flow 4 the heating circuit 3, there are, in series, a shutoff valve 7, a 3-way mixing valve 8, a pump 9, a nonreturn device 10, a temperature sensor 11 and a further shutoff valve 12. A further shutoff valve 13, a further temperature sensor 14 and yet a further shutoff valve 15 are arranged in the return 5, depicted by dashes, of the heating circuit 3. By means of the three-way mixing valve, the temperature of the forward flow 4 can be regulated via an admixing conduit 16, likewise depicted by dashes, to the return 5.

The functioning of the heat exchanger 2 in conjunction with the heating circuit 3 is clear to any person skilled in the art and does not need to be explained in any more detail. The heating circuit 3 may be connected to a district heat generator or other heat transfer media instead of to the heating source 6.

The heat exchanger 2 is arranged, here, within the tank 1. It is clear that a heat exchanger may also be arranged outside the tank 1 and in contact with the tank inner wall, so that heat is not transmitted directly to the drinking water in the tank, but is transmitted to the drinking water via the tank inner wall. The tank 1 is then designed in a known way as a double-jacket boiler.

The tank 1 is connected via an outlet conduit 17 to a warm drinking water conduit system 18 (shown in simplified form here), from which any desired number of tapping points, even on different floors of a building, can be branched off.

In the example, merely for the sake of simplicity, and without any restriction, only on the first floor of a building, a warm drinking water tapping point 19 is connected via a warm water meter 20 and a shutoff valve 21 to the warm drinking water conduit system 18, which, with the tank 1 tied in, forms a closed circulation circuit in the direction of the arrows 23, for which purpose the warm water conduit system 18 is connected to the tank 1 via a branch 18' upstream of the shutoff valve 21 and via a return conduit 22. For the circulation of heated drinking water in the conduit system 18, the return conduit 22 has connected into it a pump 24 which sucks in warm water from the conduit system 18 and feeds it back into the tank 1 via the return conduit 22.

The heat exchanger 2 is designed in such a way that, during normal operation, the tank 1 discharges warm water with a temperature of about 60° C. into the conduit system 18 via the outlet conduit 17. By means of temperature sensors, not shown, and temperature regulation, it is possible in a known way to ensure that the warm drinking water circulating in the conduit system 18 cools at most by 5K and the temperature in the return line 22 to the tank 1 is still at least at 55° C. The return conduit 22 is connected via a connection 25, in the middle region of the tank 1 just above the heat exchanger 22, to the tank 1, which is connected in the conventional way to a cold drinking water conduit 28 via a first shutoff valve 26, a nonreturn valve 26', a water meter 27 of the second shutoff valve 26". The connection 29 of the cold water conduit 28 to the tank 1 is located in the lower region of the latter. In this case, the cold drinking water line 28 is previously led to a level above the highest point of the tank 1, where a safety valve 30 is arranged. The conduit 28 has branching off from it a conduit 28', to which any desired number of tapping points are connected. In the example, only one cold drinking water tapping point 19' is connected in parallel with the warm drinking water tapping point 19 via a shutoff valve 21'.

A three-way changeover valve 31, which precedes the pump in the direction of flow of the warm water 24, is connected into the return conduit 22.

The three-way changeover valve, in one of its switching positions, is switched to passage to the tank 1. In its other position, it bypasses the outlet conduit 17 via a branch conduit 32 to the return conduit 22.

Consequently, when the three-way changeover valve is in the passage switching position, with the tank 1 being tied in, the warm drinking water circulates in the entire conduit system 18, together with the tapping points branching off from it (in the example, only the tapping point 19). This circulation (large circuit) is designated, here, as "full circulation" and largely ensures that the entire conduit system 18 is free from legionellae.

If the three-way changeover valve is in the bypass position, with the tank tied in, the warm drinking water circulates only in the conduit circuit which is substantially reduced via the branch conduit 32 and is located near the tank 1 (small circuit). This circulation is designated, here, as a bypassed circulation circuit or "bypass circulation". The reduced conduit length of the small circuit may amount to only a few meters, for example 2 to 3 m, in the immediate vicinity of the tank 1.

The bypassed circuit remains constantly connected to the remaining conduit system 18, warm drinking water circulating only in the bypassed circulation circuit and not also in the rest of the connected conduit system.

In the return conduit 22, the pump 24 is followed in the direction of flow by a nonreturn device 33, and, upstream of the connection 25 for the return line 22 to the tank 1, a conduit 34 branches off which is lead to a connection 35 to the bottom of the tank.

A first balancing valve 36 for the fixed setting of a first part stream if located in the branch conduit 34, and a second balancing valve 38 for the fixed setting of the remaining part stream is located in the return conduit 22 between the connection 25 of the latter to the tank 1 and branch 37 to the conduit 36.

For a predominant time of the day, the three-way changeover valve is switched to passage, so that the warm drinking water flows in the entire conduit system at a minimum temperature of about 55° C. in the return conduit. Full circulation may be selected, for example, for 23 h, except, for example, in the night between 2 and 3 o'clock, when, according to experience, warm drinking water is extracted only rarely by the users.

In the relatively short time span of, for example, 50 to 60 minutes, preferably in the night between 2 and 3 o'clock, the warm drinking water is rapidly increased to about 65° C. by means of the heat exchanger 2 via temperature regulation, not shown, so that reliable thermal disinfection of the tank 1 and of the conduits in the region of the bypass circulation (small circuit) can be carried out during this time span.

In order, in this case, to ensure that all the warm water layers of the tank assume a temperature of 65° C., at which legionellae are rapidly killed, the two balancing valves 36 and 38 are set fixedly in such a way that a relatively small part stream of selected size as the warm drinking water sucked in by the pump 24 is introduced into the tank from below via the branch conduit 34, the part stream supplied flushing through the water at the bottom and below the heat exchanger 2 and between the tubes of the heat exchanger. In order at the same time to prevent the water from swirling in the tank, the part stream supplied to the tank bottom preferably amounts to about 10% of the volume sucked in by the pump 24.

As a result, even relatively colder warm water zones within the tank 1 are brought to about 60° C. during full circulation (large circuit) and to about 65° C. during bypass circulation (small circuit), in order to destroy preferred breeding places of the legionellae.

The time span of 50 to 60 minutes at a temperature of 65° C., for example in the night between 2 and 3 o'clock, is fully sufficient to kill all the legionellae in the tank with a high degree of reliability.

The branched-off part stream, lead via the conduit 34 to the tank bottom, of, for example, about 10% of the total volume sucked in by the pump 24 can be set via the valves 36 and 38, for example, in such a way that it is cut in only during bypass circulation, not also during full circulation. However, the valves 36 and 38 may also switched in such a way that the, for example, 10% part stream is cut in both during full circulation and during bypass circulation, that is to say constantly, or else only during full circulation. The part stream quantity may be capable of being set selectively. An approximately 10% part stream has proved particularly appropriate. It is clear that the invention is not restricted to this.

Bypass circulation over a total conduit length of a few meters, for example 2 to 3 m, ensures thermal disinfection, in particular of legionellae, with minimum energy consumption. It is also ensured that the use of warm drinking water continues to be possible at all the existing tapping points during thermal disinfection. Since, as stated, bypass circulation takes place only in a relatively short time span of, for example, 50 to 60 minutes, when the conduit system is frequented particularly rarely, it is justifiable for there to be the disadvantage that, when warm drinking water is extracted during this time span, the temperature of the stagnant water outside bypass circulation may be cooled to slightly below 55° C. and therefore the cooled water first has to be extracted before water at the temperature increased to 65° C. can be branched off from bypass circulation. There is no risk of the formation of legionellae during this short time span of, for example, 50 to 60 minutes. Subsequent full circulation at at least 55° C. to 60° C. over 23 hours is fully sufficient to keep the entire conduit system, including the tank, free of legionellae, in such a way that a growth of legionellae during bypass circulation can be largely ruled out.

The regulation of temperature to 60° C. and to 55° C. can take place centrally in the conventional way, known temperature sensors and the temperatures monitors being arranged at suitable points in the tank and in the conduit system. Thus, the branch 37 in the return conduit 22 may be preceded by a temperature sensor 39 which monitors the warm water temperature in the return conduit briefly, for example at minute intervals.

Time control for changing over the temperature in rota from 60° C. to 65° C. and back to 60° C. during specific day times and night times and for reversing the valves in rota for full circulation and bypass circulation may likewise be carried out from a central control apparatus.

It is clear to the person skilled in the art that, in a relatively large drinking water conduit system according to the invention, a plurality of drinking water heater/storage tanks may be connected in parallel to a drinking water conduit 28, each tank 1 being provided with a heat exchanger 2, said heat exchangers being capable of being connected in parallel to their own heating circuit 3, and bypass circulation including both tanks, and there being connected to the bottom of each tank in each case a conduit 34, via which parallel part streams are branched off from the bypass circulation circuit common to both tanks, so that complete thermal disinfection of both tanks can be ensured.

What is claimed is:

1. A warm drinking water conduit system connected to at least one tank for warm drinking water, which is connected to a cold water supply conduit for supplying cold drinking water into said tank and provided with a heat exchanger for heating said cold water in said tank to a predetermined temperature and maintaining a temperature of said warm water in said warm drinking conduit system, said warm drinking water conduit system comprising:

an outlet conduit extending from said tank for allowing said warm water to flow therefrom;

at least one tapping point provided in said outlet conduit for extracting said warm water;

a return conduit connected from said outlet conduit and to said tank for returning said warm water to said tank;

a pumping device provided in said return conduit for feeding back said warm water to said tank; and a changeover valve provided in said return conduit for selecting a first position to allow said warm water to flow in a full conduit circuit including said tank during a long time span, or a second position to allow said warm water to flow in a bypass conduit circuit through a bypass conduit between said outlet and return conduits in the vicinity of said tank during a short time span, wherein changes from said first position to said second position and vice versa are made and monitored according to a predetermined time program, and said temperature of said warm water is regulated and monitored such that a first temperature is set during said long time span so as to rule out infection of microbacteria, particularly legionellae and a second temperature is set during said short time span so as to thermally disinfect said tank.

2. The drinking water conduit system according to claim 1, wherein said first temperature is approximately 60° C. and said second temperature is approximately 65° C.

3. The drinking water conduit system according to claim 1, said short time span is determined by a user, preferably once a day and a duration of 50 to 60 minutes and said long time span is the remaining time span.

4. The drinking water conduit system according to claim 1, wherein said tank is a continuous-flow drinking water heater with warm drinking water storing capacity of more than 400 litters, and said heat exchanger is arranged in said tank or within double walls of said tank.

5. The drinking water conduit system according to claim 1, wherein said pumping device is disposed after said changeover valve.

6. The drinking water conduit system according to claim 1, wherein said bypass conduit is a few meters long.

7. The drinking water conduit system according to claim 1, wherein said warm water sucked in by said pumping device is divided at a branch point into two streams, one of which flows into a middle of said tank via a first balancing valve and the other of which flows into a bottom of said tank via a second balancing valve.

8. The drinking water conduit system according to claim 7, an amount of said one stream flowing into said middle of said tank is approximately 90% of said warm water sucked in by said pumping device and an amount of said other stream flowing into said bottom of said tank is approximately 10% of said warm water sucked in by said pumping device.

* * * * *